United States Patent
Patange et al.

(10) Patent No.: US 9,911,014 B2
(45) Date of Patent: Mar. 6, 2018

(54) METHOD OF TRANSFERRING DATA, COMPUTER PROGRAM PRODUCT AND TAG

(71) Applicant: NXP B.V., Eindhoven (NL)

(72) Inventors: Sreedhar Patange, Bangalore (IN); Nitin Labdhe, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/626,887

(22) Filed: Feb. 19, 2015

(65) Prior Publication Data

US 2015/0235059 A1  Aug. 20, 2015

(30) Foreign Application Priority Data

Feb. 19, 2014 (EP) ..................... 14155694

(51) Int. Cl.
   *G06K 7/10* (2006.01)
   *G06K 19/07* (2006.01)

(52) U.S. Cl.
   CPC ..... *G06K 7/10009* (2013.01); *G06K 19/0723* (2013.01)

(58) Field of Classification Search
   CPC .......... G03B 17/38; G03B 7/097; G03B 7/16; G06F 13/4059; G06F 3/0601; G06F 12/0246; G11C 16/06; Y02B 60/1228; G06K 7/10009; G06K 19/0723
   See application file for complete search history.

(56) References Cited

U.S. PATENT DOCUMENTS

| | | |
|---|---|---|
| 2003/0174048 A1 | 9/2003 | McCorkle |
| 2007/0293155 A1 | 12/2007 | Liao et al. |
| 2010/0134257 A1 | 6/2010 | Puleston et al. |
| 2010/0141387 A1* | 6/2010 | Kosaka ............... G06F 13/32 340/10.1 |
| 2011/0055471 A1 | 3/2011 | Thatcher et al. |
| 2013/0063253 A1* | 3/2013 | Rashid ............ G06K 19/07769 340/10.5 |
| 2014/0068145 A1* | 3/2014 | Gallo .................. G06F 13/4059 711/103 |

FOREIGN PATENT DOCUMENTS

CN          102598020 A        7/2012

OTHER PUBLICATIONS

"Mifare" NXP Semiconductors, 1 pg, retrieved from the internet Feb. 17, 2015 at: www.mifare.net.

(Continued)

*Primary Examiner* — Sonji Johnson

(57) ABSTRACT

There is disclosed a method of transferring data using a tag, said tag comprising an RF interface unit, a host interface unit and a memory, the method comprising: the RF interface unit connects the tag to an RF device; the host interface unit connects the tag to a host device; the tag enters into a pass-through mode; in said pass-through mode, the tag transfers data, either in a first configured transfer direction, from the RF device to the host device, or, in a second configured transfer direction, from the host device to the RF device; in said pass-through mode, the tag buffers said data in the memory. Furthermore, a corresponding computer program product and a corresponding tag are disclosed.

14 Claims, 3 Drawing Sheets

(56) References Cited

OTHER PUBLICATIONS

"Type 1 Tag Operation Specification, Technical Specification, T1TOP 1.1", NFC Forum, 47 pgs, retrieved from the internet at: apps4android.org/nfc-specifications/NFCForum-TS-Type-1-Tag_1.1.pdf (Apr. 13, 2011).
"Type 2 Tag Operation Specification, Technical Specification, T2TOP 1.1", NFC Forum, 53 pgs, retrieved from the internet at: apps4android.org/nfc-specifications/NFCForum-TS-Type-2-Tag_1.1.pdf (May 31, 2011).
"Type 3 Tag Operation Specification, Technical Specification, T3TOP 1.1", NFC Forum, 33 pgs, retrieved from the internet at: apps4android.org/nfc-specifications/NFCForum-TS-Type-3-Tag_1.1.pdf (Jun. 28, 2011).
"Type 4 Tag Operation, Technical Specification, T4TOP 2.0", NFC Forum, 38 pgs, retrieved from the internet at: apps4android.org/nfc-specifications/NFCForum-TS-Type-4-Tag_2.0.pdf (Nov. 18, 2010).
"ISO/IEC 14443-3, Identification cards—Contactless integrated circuit cards—Proximity cards, Part 3: Initialization and anticollision", ISO/IEC, 70 pgs, retrieved from the internet at: http://www.iso.org/iso/catalogue_detail.htm?csnumber=50942 (Apr. 15, 2011).
"NFC Forum Type Tags White Paper V1.0", NXP Semiconductors, 24 pages, retrieved from the internet at: http://members.nfc-forum.org/resources/white_papers/NXP_BV_Type_Tags_White_Paper-Apr_09.pdf (Apr. 1, 2009).
Office Action for Counterpart CN Patent Appln. No. 201510075324.6 (May 3, 2017).

* cited by examiner

METHOD OF TRANSFERRING DATA, COMPUTER PROGRAM PRODUCT AND TAG

CROSS-REFERENCE TO RELATED APPLICATIONS

This application claims the priority under 35 U.S.C. § 119 of European patent application no. 14155694.4, filed on Feb. 19, 2014, the contents of which are incorporated by reference herein.

FIELD

The present disclosure relates to method of transferring data using a tag. Furthermore, the present disclosure relates to a corresponding computer program product and to a corresponding tag.

BACKGROUND

Today, contactless tags such as RFID tags and near field communication NFC tags may be equipped with a so-called "host connection". Such a host connection typically consists of a wired connection to a host device with which a tag is associated. For example, the wired connection may be a connection established by an I²C interface unit, a USB interface unit, an SPI interface unit or a UART interface unit comprised in the tag. Since the tag typically also comprises an RF interface, it is often referred to as a "dual-interface tag". It has been recognized that a dual-interface tag may offer a relatively cheap and convenient way to exchange data between the host device and the external RF device with which the tag is able to communicate. That is to say, a dual-interface tag of the kind set forth may be used as an attractive alternative to an NFC device acting in peer-to-peer mode, for example. In peer-to-peer mode, two NFC devices may exchange data such as virtual business cards and digital photos. However, this requires an NFC initiator/reader chip on both sides of the communication channel, which increases the cost of such a system. In applications such as gaming, Bluetooth® and Wi-Fi® pairing, the amount of data required to be exchanged is very low and therefore the throughput requirements are relatively low. Hence, using a peer-to-peer mode may be too expensive in such low-cost applications. The use of a dual-interface RFID/NFC tag may be very effective and results in a low-cost solution for data exchange. Although a dual-interface tag is a relatively inexpensive yet effective tool for exchanging data between an RF device and a host device, there may still exist a need for an improved control of said data exchange.

SUMMARY

There is disclosed a method of transferring data using a tag, said tag comprising an RF interface unit, a host interface unit and a memory, the method comprising: the RF interface unit connects the tag to an RF device; the host interface unit connects the tag to a host device; the tag enters into a pass-through mode; in said pass-through mode, the tag transfers data, either in a first configured transfer direction, from the RF device to the host device, or, in a second configured transfer direction, from the host device to the RF device; in said pass-through mode, the tag buffers said data in the memory.

According to an illustrative embodiment, buffering said data in the memory comprises that the tag buffers said data in a volatile memory which is mirrored on predefined blocks of a non-volatile memory.

According to a further illustrative embodiment, when the tag transfers the data in the first configured transfer direction, the tag restricts the access to said memory to the RF interface unit until a terminal block of said memory has been written by the RF device.

According to a further illustrative embodiment, when the tag transfers the data in the first configured transfer direction, the tag sends an interrupt signal to the host device when a terminal block of said memory has been written by the RF device.

According to a further illustrative embodiment, the tag sends the interrupt signal to the host device through a field detect pin comprised in said tag.

According to a further illustrative embodiment, when the tag transfers the data in the first configured transfer direction, the tag restricts the access to said memory to the host interface unit until a terminal block of said memory has been read by the host device.

According to a further illustrative embodiment, when the tag transfers the data in the second configured transfer direction, the tag restricts the access to said memory to the host interface unit until a terminal block of said memory has been written by the host device.

According to a further illustrative embodiment, when the tag transfers the data in the second configured transfer direction, the tag restricts the access to said memory to the RF interface unit until a terminal block of said memory has been read by the RF device.

According to a further illustrative embodiment, when the tag transfers the data in the second configured transfer direction, the tag sends an interrupt signal to the host device when a terminal block of said memory has been read by the RF device.

According to a further illustrative embodiment, the tag sends the interrupt signal to the host device through a field detect pin comprised in said tag.

Furthermore, there is disclosed a computer program product comprising instructions which, when being executed by a processing unit comprised in a tag, carry out or control respective steps of a method of the kind set forth.

Furthermore, there is disclosed a tag for transferring data, said tag comprising: an RF interface unit for connecting the tag to an RF device; a host interface unit for connecting the tag to a host device; a memory; wherein the tag is arranged to enter into a pass-through mode; wherein, in said pass-through mode, the tag is arranged to transfer data, either in a first configured transfer direction, from the RF device to the host device, or, in a second configured transfer direction, from the host device to the RF device; wherein, in said pass-through mode, the tag is arranged to buffer said data in the memory.

According to a further illustrative embodiment, the RF interface unit is an RFID interface unit or an NFC interface unit.

According to a further illustrative embodiment, the host interface unit is a wired interface unit, such as an I2C interface unit, a USB interface unit, an SPI interface unit or a UART interface unit.

DESCRIPTION OF DRAWINGS

Embodiments will be described in more detail with reference to the appended drawings, in which.

DESCRIPTION OF EMBODIMENTS

In accordance with the present disclosure, a tag and a method of transferring data using a tag are provided. The tag comprises an RF interface unit, a host interface unit and a memory. The RF interface unit connects the tag to an RF device and the host interface unit connects the tag to a host device. In order to better control the exchange of data between the RF device and the host device, the tag enters into a pass-through mode. In the pass-through mode the tag transfers data, in a first configured transfer direction, from the RF device to the host device, or, in a second configured transfer direction, from the host device to the RF device. Furthermore, in said pass-through mode, the tag buffers said data in the memory. By defining a dedicated mode for the data exchange between the RF device and the host device, in which the transfer direction is configured, the data exchange may be con-trolled more effectively. Furthermore, according to the illustrative embodiments described hereinafter, the control of the memory access and the interaction with the host device may be improved in a relatively simple yet effective manner.

Figure 1:
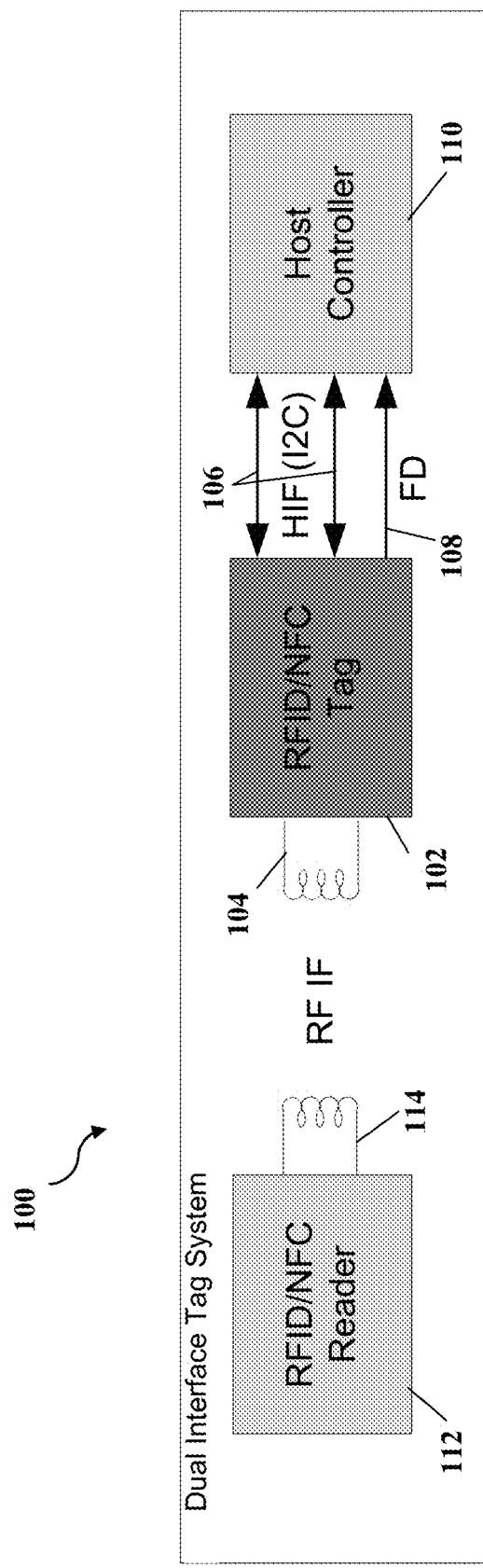
FIG. 1 shows an illustrative embodiment of a tag system.

FIG. 1 shows an illustrative embodiment of a tag system. The tag system 100 comprises an RFID/NFC tag 102, an RFID/NFC reader 112 and a host controller 110. The RFID/NFC tag 102 is an example of a tag of the kind set forth. The RFID/NFC reader 112 is an example of an RF device of the kind set forth. The host controller 110 is an example of a controller unit that may form part of a host device of the kind set forth; a dual-interface tag is typically connected to a host device via its controller unit. The RFID/NFC tag 102 comprises an RF interface 104 unit for establishing an RF interface (i.e. a communication channel) between the tag and the RFID/NFC reader 112. For this purpose, the RFID/NFC reader 112 also comprises an RF interface unit 114. Furthermore, a host interface 106 is present between the RFID/NFC tag 102 and the host controller 110. In this example, the host interface 106 is an I²C interface. Furthermore, a field detect interface 108 is present between the RFID/NFC tag 102 and the host controller 110. The field detect interface 108 may for example be established by connecting the tag's field detect pin to one of the interrupt pins of the host controller 110.

In operation, the RFID/NFC tag 102 may enter a pass-through mode which facilitates the exchange of data between the RFID/NFC reader 112 and the host controller 110. Specifically, in the pass-through mode the RFID/NFC tag 102 transfers data, at a given moment in time, either from the RFID/NFC reader 112 to the host controller 110 or from the host controller 110 to the RFID/NFC reader 112, depending on how the pass-through mode is configured. Furthermore, in the pass-through mode the RFID/NFC tag 112 buffers the data in its memory (not shown).

In a specific and illustrative implementation, the RFID/NFC tag 112 may contain both a volatile memory (e.g. an SRAM) and a non-volatile memory (e.g. an EEPROM). For instance, an SRAM of 64 bytes may be embedded in the tag. In that case, in the pass-through mode the SRAM may be mirrored on predefined EEPROM blocks in order to facilitate bulk data transfer from the RFID/NFC reader 112 to the host controller 110 or vice versa. This SRAM mirroring may ensure that the SRAM is used for data exchange only in specific modes of operation corresponding to bulk data transfers, for example. If these modes are not configured, then the tag's memory is always visible as a non-volatile memory for the RFID/NFC reader 112. The volatile memory (SRAM) may be used for bulk data transfer, instead of the non-volatile memory, in order to avoid that the non-volatile memory wears out too quickly.

In order to further improve the control the access to the memory, a terminal block concept may be introduced. For example, in a memory such as MIFARE® Classic (16 bytes per block), the last block of the data sector (block 2 for a 64-byte SRAM) may be used as the terminal block. In a memory such as NFC Type2 Tag (4 bytes per block), the last data block (block 15 for a 64-byte SRAM) may be used as the terminal block. Accordingly, the last block in SRAM may be used as the terminal block during read/write operations via the RF interface and the last block of the data sector of the SRAM may be used as the terminal block during read/write operations via the host interface. Once the terminal block is read or written through one of the RF interface and the host interface, the control may be transferred to the other interface. The application software installed on the RFID/NFC reader 112 and the host controller 110 may be pre-aligned to transfer 16/32/48/64 bytes of data.

Control and Status Mechanism

The control of the memory access and the interaction with the host device may be implemented by means of the following control and status mechanism, which is to be regarded as a non-limiting example. In order to facilitate memory access control in the pass-through mode, the tag may contain a control register having the contents shown in Table 1.

TABLE 1

Control Register
CONTROL REGISTER

| Bit Name | Bit Width | Default | Comment |
| --- | --- | --- | --- |
| PT_MODE_EN | 1 | 0 | 1: Enable PT mode<br>0: Disable PT mode |
| XFER_DIR | 1 | 0 | Indicates the data transfer direction when PT_MODE_EN = 1<br>1: Data transfer direction RF → HIF<br>0: Data transfer direction HIF → RF |
| FD_ON | 2 | 0 | 0/1/2: Other Mode/Condition<br>3: FD in PT mode (see Table 3) |
| FD_OFF | 2 | 0 | 0/1/2: Other Mode/Condition<br>3: FD in PT mode (see Table 4) |

In this example, the bit PT_MODE_EN indicates whether or not the pass-through mode of the tag is enabled. Furthermore, the bit XFER_DIR indicates the transfer direction during the pass-through mode. That is to say, if PT_MODE_EN=1 and XFER_DIR=1, then the tag is in the pass-through mode and the tag transfers data from the RF device, via the RF interface, to the host device, via the host interface. Furthermore, if PT_MODE_EN=1 and XFER_DIR=0, then the tag is in the pass-through mode and the tag transfers data from the host device, via the host interface, to the RF device, via the RF interface. In a specific and illustrative implementation, these 2 bits may be read and written via the host interface and read, but not written, via the RF interface. The behavior of the FD pin using FD_ON or FD_OFF for a given mode is user-configurable and may be defined as in Table 3 and Table 4.

Furthermore, in order to facilitate memory access control in the pass-through mode, the tag may contain a status register having the contents shown in Table 2.

TABLE 2

Status Register
STATUS REGISTER

| Bit Name | Bit Width | Default | Comment |
|---|---|---|---|
| HIF2RF_SRAM | 1 | 0 | 1: Data is ready in SRAM for RF read |
| | | | 1: Data, is not ready in SRAM for RF read |
| RF2HIF_SRAM | 1 | 0 | 1: Data is ready in SRAM for HIF Read |
| | | | 0: Data is not ready in SRAM for HIF Read |
| RFIF_ON_OFF | 1 | 0 | 1: Memory access is Locked to RFIF |
| | | | 0: Memory access is not Locked to RFIF |
| HIF_ON_OFF | 1 | 0 | 1: Memory access is Locked to HIF |
| | | | 0: Memory access is not Locked to HIF |

The status register bits as shown in Table 2 may be read by the RF device and the host device. The bits RFIF_ON_OFF and HIF_ON_OFF indicate whether the memory access is locked (i.e. restricted) to the RF interface and the host interface, respectively. The bits HIF2RF_SRAM and RF2HIF_SRAM indicate whether data is ready in SRAM for reading by the RF device, via the RF interface, and the host device, via the host interface, respectively.

FD Pin Configuration

Most of the existing tags implement an FD pin. In order to improve the interaction with the host device in the pass-through mode, interrupt signals may be sent to the host device in order to signal the availability of data in the tag's memory, for example. However, adding a pin to the tag for the sole purpose of transmitting an interrupt signal to the host device would be undesirable, in particular in view of the fact that the package size would also increase. Therefore, in accordance with illustrative embodiments of the presently disclosed tag, the tag's existing FD pin may be used for this purpose. Furthermore, an effective mechanism for data exchange may be defined, based on the above-described control and status mechanism, for reusing the existing FD pin as an interrupt channel to the host device, while retaining the original functionality of the FD pin. The FD pin may be connected to one of the interrupt pins of the host controller, i.e. the controller unit of the host device. The FD pin may among others be used as interrupt source for waking up an embedded microcontroller, for example in a printing device, e-metering device or gaming device. Typical use cases of the presently disclosed tag and data transfer method are the exchange of application data, software updates, and the exchange of data required for Bluetooth® and Wi-Fi® pairing procedures.

In Table 3 and Table 4, the conditions related to FD_ON=3 and FD_OFF=3 are described. It is noted that the term OFF as used herein represents logic "0" and the term ON represents logic "1". However, these logic values are merely illustrative and may be defined differently depending on the system requirements. Normally, the FD pin is in the OFF state for the pass-through mode with FD_OFF=3 and FD_ON=3. The FD pin is turned ON for the pass-through mode if the FD-assert condition as defined in Table 3 is met; this also causes an interrupt assertion to the host device. Similarly, the FD pin is turned OFF for the pass-through mode if the FD-de-assert condition as defined in Table 4 is met; this also causes an interrupt de-assertion to the host device.

TABLE 3

FD_ON settings

| FD_ON | FD assert condition | Comment |
|---|---|---|
| 0, 1, 2 | Other conditions | |
| 3 | In PT mode with RF→HIF, If the data is ready for HIF to read | Indication to the host during RF←→HIF transfer |
| | In PT mode with HIF→RF, If the last data is read by RF | |

TABLE 4

FD_OFF settings

| FD_OFF | FD deassert condition | Comment |
|---|---|---|
| 0, 1, 2 | Other conditions | |
| 3 | If FD_ON = 3 | Indication to the host during RF←→HIF transfer. |
| | "In PT mode with RF→HIF, If last data is read by HIF" | |
| | OR | |
| | "In PT mode with HIF→RF, If last data is written by HIF" | |

Connection Handover

Figure 2:
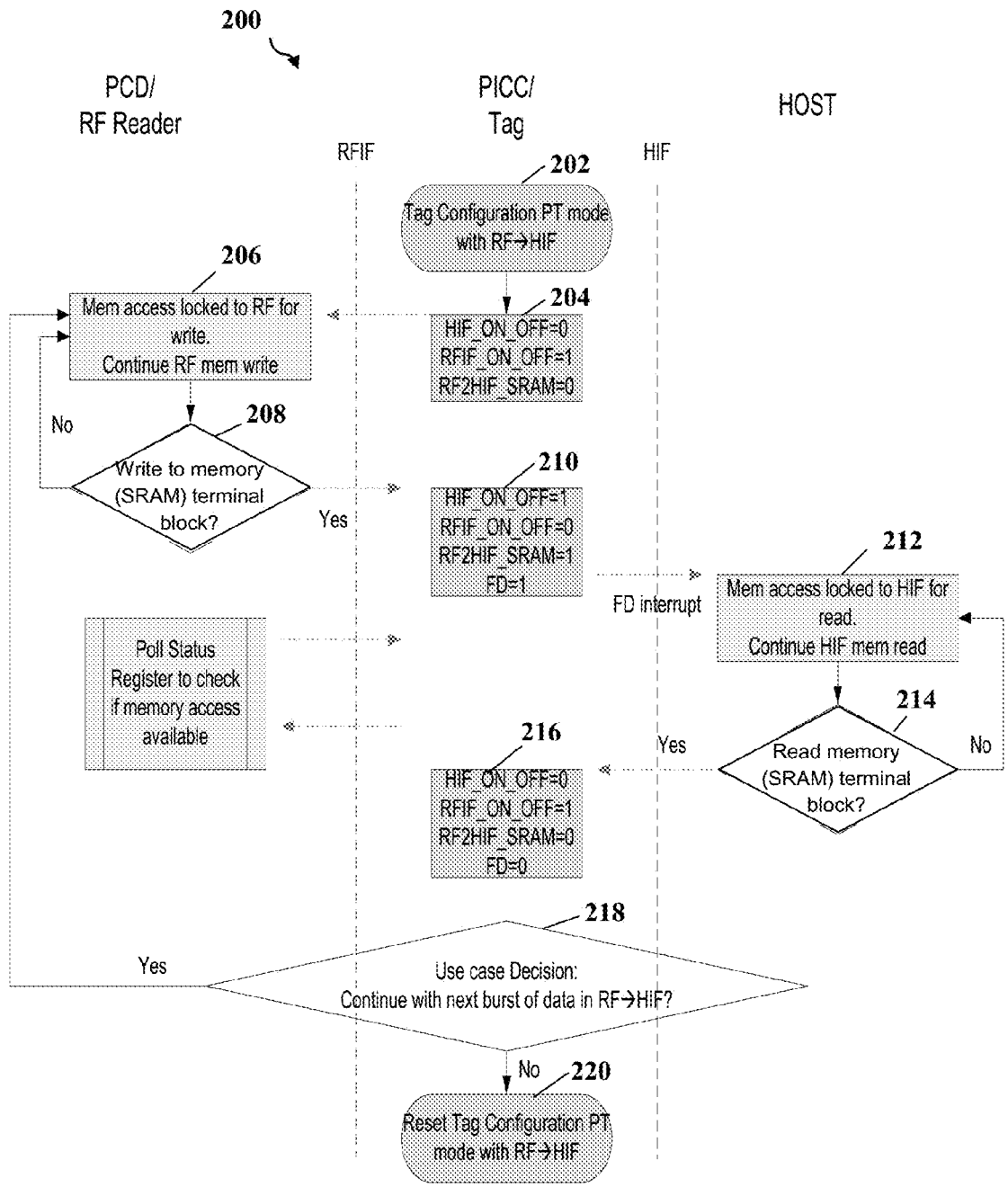
FIG. 2 shows an illustrative embodiment of a data transfer method.

FIG. 2 shows an illustrative embodiment of a data transfer method. In particular, a method 200 of transferring data in the first direction is shown. i.e. from the RF device to the host device.

In order to facilitate this data transfer, in a step 202 the tag may enter into the pass-through mode, i.e. bit PT_MODE_EN is set to 1, and the transfer direction is configured as RF→HIF, i.e. bit XFER_DIR is also set to 1 along with FD_ON=3 and FD_OFF=3. In a further step 204, bits HIF_ON_OFF and RF2HIF_SRAM may be set to 0 and bit RFIF_ON_OFF may be set to 1 automatically. In a further step 206 the RF device may write data to the tag's memory while the memory access is locked to the RF interface. Once data is written in a further step 208 to the terminal block of the SRAM via the RFIF, at the end of the WRITE command, bit RF2HIF_SRAM may be set to 1 and bit RFIF_ON_OFF may be set to 0 automatically in a further step 210. Furthermore, the memory access may be locked to the host interface by setting bit HIF_ON_OFF to 1 and turning the FD pin ON (meaning that the field detect pin is activated, which is shown as FD=1) in the same step 210. Furthermore, changing the FD pin to the ON state for the pass-through mode interrupts the host device, indicating that data is ready to be read from SRAM. Upon detecting that the FD pin is said ON state, the host device reads the status register to identify the origin of interrupt, and it finds that bit RF2HIF_SRAM=1. In a further step 212 the host device reads data from the tag's memory while the memory access is locked to the host interface. Once the host device reads, in a further step 214, from the terminal block of the SRAM via the host interface, bits RF2HIF_SRAM, HIF_ON_OFF and the FD pin are automatically reset to 0 in a further step 216 and the memory access may be locked to the RF interface again by setting bit RFIF_ON_OFF to 1 in the same step 216. If the use case requires that the burst data exchange is to be continued in RF→HIF mode, then the above-mentioned steps may have to be repeated as illustrated by step 218 in FIG. 2. The tag's pass-through mode with transfer direction RF→HIF may be reset in a further step 220.

Figure 3:
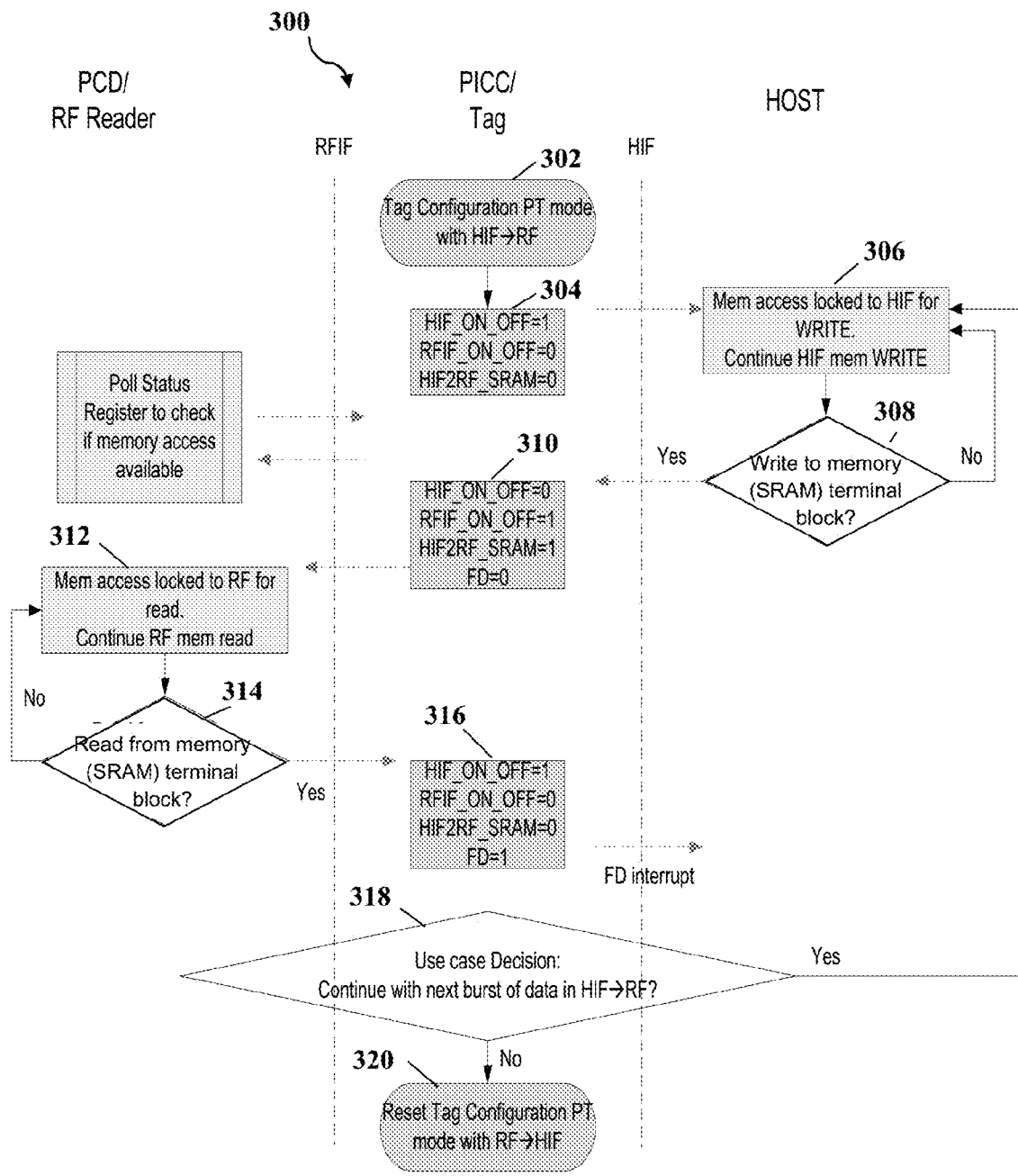
FIG. 3 shows a further illustrative embodiment of a data transfer method.

FIG. 3 shows a further illustrative embodiment of a data transfer method. In particular, a method 300 of transferring data in the second direction is shown, i.e. from the host device to the RF device.

In order to facilitate this data transfer, in a first step 302 the tag may enter into the pass-through mode, i.e. bit PT_MODE_EN is set to 1, and the transfer direction is configured as HIF→RF, i.e. bit XFER_DIR is set to 0 along with FD_ON=3 and FD_OFF=3. In a further step 304, bit HIF_ON_OFF may be set to 1 and bits RFIF_ON_OFF and HIF2RF_SRAM may be set to 0 automatically. In a further step 306 the host device may write data to the tag's memory while the memory access is locked to the host interface. Once data is written in a further step 308 to the terminal block of the SRAM via the HIF, at the end of the WRITE command, bit HIF2RF_SRAM is set to 1 and bit HIF_ON_OFF is automatically reset to 0 and the memory access is locked to RF setting RFIF_ON_OFF=1 along with FD pin being turned OFF in a further step 310. In a further step 312, the RF device may read the data from the tag's memory while the memory access is locked to the RF interface. Once the RF device reads, in a further step 314, the terminal block of the SRAM, bits HIF2RF_SRAM and RFIF_ON_OFF may be automatically reset to 0 along with the FD pin being turned ON and the memory access may be locked to the host interface by setting HIF_ON_OFF to 1 in a further step 316. If the use case requires the burst data exchange is to be continued in HIF→RF mode, then the above-mentioned steps may have to be repeated as illustrated by step 318 in FIG. 3. The tag's pass-through mode with transfer direction HIF→RF may be reset in a further step 320. At the end of the data exchange, FD_ON and FD_OFF may be set to a value other than 3 together with pass through mode being disabled. As shown in Table 3 and Table 4, FD_ON and FD_OFF values other than 3 may indicate other field detect conditions in other operational modes of the tag.

It is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF ACRONYMS

RFID Radio Frequency Identification
NFC Near Field Communication
I2C Inter IC Bus
USB Universal Serial Bus
UART Universal Asynchronous Receiver Transmitter
SPI Serial Peripheral Interface
PICC Proximity Integrated Circuit Card
PCD Proximity Coupling Device
FD Field Detect
PT Pass-Through
HIF Host Interface
RFIF RF Interface

LIST OF REFERENCE SIGNS

100 tag system
102 RFID/NFC tag
104 RF interface unit
106 host interface
108 field detect interface
110 host controller
112 RFID/NFC reader
114 RF interface unit
200 data transfer method
202 method step
204 method step
206 method step
208 method step
210 method step
212 method step
214 method step
216 method step
218 method step
220 method step
300 data transfer method
302 method step
304 method step
306 method step
308 method step
310 method step
312 method step
314 method step
316 method step
318 method step
320 method step

The invention claimed is:

1. A method of transferring data using a tag, said tag comprising an RF interface unit, a host interface unit and a memory, the method comprising:
   the RF interface unit connects the tag to an RF device;
   the host interface unit connects the tag to a host device;
   the tag enters into a pass-through mode;
   in said pass-through mode, the tag transfers data, either in a first configured transfer direction, from the RF device to the host device, or, in a second configured transfer direction, from the host device to the RF device;

in said pass-through mode, the tag buffers said data in the memory, wherein buffering said data in the memory comprises that the tag buffers said data in a volatile memory which is mirrored on predefined blocks of a non-volatile memory.

2. A method as claimed in claim 1, wherein, when the tag transfers the data in the first configured transfer direction, the tag restricts the access to said memory to the RF interface unit until a terminal block of said memory has been written by the RF device.

3. A method as claimed in claim 1, wherein, when the tag transfers the data in the first configured transfer direction, the tag sends an interrupt signal to the host device when a terminal block of said memory has been written by the RF device.

4. A method as claimed in claim 3, wherein the tag sends the interrupt signal to the host device through a field detect pin comprised in said tag.

5. A method as claimed in claim 1, wherein, when the tag transfers the data in the first configured transfer direction, the tag restricts the access to said memory to the host interface unit until a terminal block of said memory has been read by the host device.

6. A method as claimed in claim 1, wherein, when the tag transfers the data in the second configured transfer direction, the tag restricts the access to said memory to the host interface unit until a terminal block of said memory has been written by the host device.

7. A method as claimed in claim 1, wherein, when the tag transfers the data in the second configured transfer direction, the tag restricts the access to said memory to the RF interface unit until a terminal block of said memory has been read by the RF device.

8. A method as claimed in claim 1, wherein, when the tag transfers the data in the second configured transfer direction, the tag sends an interrupt signal to the host device when a terminal block of said memory has been read by the RF device.

9. A method as claimed in claim 8, wherein the tag sends the interrupt signal to the host device through a field detect pin comprised in said tag.

10. A non-transitory computer-readable storage medium carrying one or more sequences of instructions which, when being executed by a processing unit comprised in a tag, carry out or control respective steps of a method as claimed in claim 1.

11. A tag for transferring data, said tag comprising:

an RF interface unit for connecting the tag to an RF device;

a host interface unit for connecting the tag to a host device;

a memory;

wherein the tag is arranged to enter into a pass-through mode;

wherein, in said pass-through mode, the tag is arranged to transfer data, either in a first configured transfer direction, from the RF device to the host device, or, in a second configured transfer direction, from the host device to the RF device;

wherein, in said pass-through mode, the tag is arranged to buffer said data in the memory, wherein the memory is a volatile memory which is mirrored on predefined blocks of a non-volatile memory.

12. A tag as claimed in claim 11, wherein the RF interface unit is an RFID interface unit or an NFC interface unit.

13. A tag as claimed in claim 11, wherein the host interface unit is a wired interface unit including one of an I²C interface unit, a USB interface unit, an SPI interface unit or a UART interface unit.

14. A method of transferring data using a tag, said tag comprising an RF interface unit, a host interface unit and a memory, the method comprising:

the RF interface unit connects the tag to an RF device;

the host interface unit connects the tag to a host device;

the tag enters into a pass-through mode;

in said pass-through mode, the tag transfers data, either in a first configured transfer direction, from the RF device to the host device, or, in a second configured transfer direction, from the host device to the RF device;

in said pass-through mode, the tag buffers said data in the memory, wherein, when the tag transfers the data in the first configured transfer direction, the tag sends an interrupt signal to the host device when a terminal block of said memory has been written by the RF device, and wherein, when the tag transfers the data in the first configured transfer direction, the tag restricts the access to said memory to the RF interface unit until a terminal block of said memory has been written by the RF device.

* * * * *